UNITED STATES PATENT OFFICE.

LESLIE VERO ATKINSON, OF CARSHALTON, ENGLAND, ASSIGNOR TO THE I. R. REFRACTORY ORE SYNDICATE LIMITED, OF LONDON, ENGLAND.

PROCESS OF TREATING REFRACTORY ORES CONTAINING IRON SULFIDS.

No. 824,699.     Specification of Letters Patent.     Patented July 3, 1906.

Application filed July 6, 1905. Serial No. 268,530.

*To all whom it may concern:*

Be it known that I, LESLIE VERO ATKINSON, a subject of the King of Great Britain and Ireland, residing at Gillmon House, Carshalton, in the county of Surrey, England, have invented new and useful Improvements in Processes for Treating Refractory Ores Containing Iron Sulfids, of which the following is a specification.

This invention relates to so-called "refractory" ores, which contain iron sulfids, and is a wet process for the recovery from such ores of iron, gold, silver, copper, cobalt, and arsenic. It is designed to purify and prepare the ores which contain iron in large percentage, and I have found that the refractory character of the ores is defined by the presence therein of iron and that it is possible to closely recover the metals mixed therewith upon the removal of the iron without any extreme heat being necessary to remove the said iron, which will thus leave other metals in the ore unchanged. It has, moreover, been found that the recovery of the said metals from the ores can be well carried out by known processes so long as the iron has been removed from the said ores at a merely gentle heat, so that the process of extraction can be made payable.

My method is after having broken up the ore to a certain fineness and by having concentrated them closely to raise the value of the metal contents to sulfate the iron in the ores by means of a dense steam atmosphere from which the free admission of atmospheric air is excluded. This may be done at a temperature of about 350° Fahrenheit. As the generation of the sulfate from the sulfid proceeds more quickly under slight pressure of steam and at a greater heat, this may be gradually raised to a temperature of about 700° Fahrenheit, which is the limit of the temperature required.

I am aware that the production of iron and other sulfates from ores is not novel; but the excess temperature usually used to make the copper sulfid into a sulfate will produce at the same time an iron peroxid, so that it cannot be removed from the ore and will serve to spoil the result. Under these conditions of temperature sulfur and arsenic will volatilize and may, with the waste steam, be allowed to escape to a suitable condenser for the collection of the arsenic. When the arsenic has been eliminated, the temperature may be raised another 50° Fahrenheit, and during this period a grinder in the furnace is started to still further reduce the ore to a finer grade and to still further operate upon the iron present. This point may be tested during calcination to determine the necessary fineness of the ore and the necessary amount of iron to be sulfated.

The operation in the conversion of sulfid of iron to sulfate may take from two to four hours, and about forty minutes is required before the admission of the steam to get the necessary temperature in the furnace. Iron sulfate readily dissolves in boiling water and in a somewhat slower degree in hot or even cold water. Therefore I prefer to use a steam-coil in order to raise the water to or near boiling-point. At this point of iron sulfation the ore is discharged from the first furnace to the vats, filters, or other vessels in which the iron sulfate is removed from the ore by means of boiling water. It is preferable that the ore discharge shall be under cover, as too much air is not desirable; but the use of covered trucks which will exclude atmosphere will answer the purpose. The balance of the ore when the sulfate of iron is eliminated may now be treated in any usual fashion by the application of an electric current, by chlorination, or otherwise, for the collection of silver, gold, or copper, it being found that these metals are lying quite apart and distinct from each other in the ore after the elimination of the iron.

Having now described my invention, what I claim, and desire to secure by Letters Patent, is—

1. A process for treating refractory ores containing iron sulfids consisting of forming a preliminary sulfate of iron from the sulfids in the ore, before other metals present are chemically changed, and then removing the iron sulfate from the ore by dissolution in a liquid.

2. A process for treating refractory ores containing iron sulfids consisting of forming a sulfate of iron under a steam atmosphere with a gentle heat, thus leaving the other metals present untouched and then removing the iron sulfate from the ore by boiling water.

3. A process for treating refractory ores containing iron sulfids and copper arsenic consisting of forming a sulfate of iron under a steam-pressure at a temperature of not less than 350° Fahrenheit and not more than 750° Fahrenheit, this being a sufficiently gentle temperature not to make a copper or other metal sulfate, collecting the arsenious gases as a product, and then removing the sulfate of iron from the ore by boiling water.

4. A process for treating refractory gold, silver and copper bearing ores containing iron sulfids consisting of removing the iron by sulfation and a solution in boiling water from gold, silver, or copper ores, and thereafter using cyanid to recover any of the other metals of the ores.

5. In a process for treating refractory ores containing iron sulfids the reduction by grinding of the ores containing a sulfid of iron, concentrating the ores, and forming a sulfate of iron from the sulfid by an atmosphere of steam to render the sulfate soluble in boiling water for its removal from the ore.

In testimony whereof I have signed my name to this specification in the presence of two subscribing witnesses.

LESLIE VERO ATKINSON.

Witnesses:
CHARLES CARTER,
H. W. JAMESON.